US011023820B2

(12) United States Patent
Fang

(10) Patent No.: US 11,023,820 B2
(45) Date of Patent: Jun. 1, 2021

(54) SYSTEM AND METHODS FOR TRAJECTORY PATTERN RECOGNITION

(71) Applicant: University of Massachusetts, Boston, MA (US)

(72) Inventor: Hua Fang, Shrewsbury, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 1107 days.

(21) Appl. No.: 15/116,570

(22) PCT Filed: Feb. 6, 2015

(86) PCT No.: PCT/US2015/014792
§ 371 (c)(1),
(2) Date: Aug. 4, 2016

(87) PCT Pub. No.: WO2015/120255
PCT Pub. Date: Aug. 13, 2015

(65) Prior Publication Data
US 2016/0358040 A1  Dec. 8, 2016

Related U.S. Application Data

(60) Provisional application No. 61/936,671, filed on Feb. 6, 2014.

(51) Int. Cl.
*G06E 1/00* (2006.01)
*G06E 3/00* (2006.01)
(Continued)

(52) U.S. Cl.
CPC ............ *G06N 7/02* (2013.01); *G06K 9/6202* (2013.01); *G06K 9/6218* (2013.01);
(Continued)

(58) Field of Classification Search
CPC .. G06K 9/6202; G06K 9/6218; G06K 9/6253; G06N 7/02; G06T 2207/30241; G06T 7/20
See application file for complete search history.

(56) References Cited

U.S. PATENT DOCUMENTS

| | | | |
|---|---|---|---|
| 8,843,423 B2* | 9/2014 | Chu ....................... | G06N 5/025 706/12 |
| 2002/0107858 A1* | 8/2002 | Lundahl ............... | G06K 9/6218 707/999.1 |

(Continued)

FOREIGN PATENT DOCUMENTS

WO    2013/089764 A1    6/2013

OTHER PUBLICATIONS

IEEE Transactions On Computers, vol. C-18, No. 5, May 1969 "A Nonlinear Mapping for Data Structure Analysis" John W. Sammon, Jr. (Year: 1969).*

(Continued)

*Primary Examiner* — Luis A Sitiriche
(74) *Attorney, Agent, or Firm* — Hamilton, Brook, Smith & Reynolds, P.C.

(57) ABSTRACT

A multiple imputation (MI) based fuzzy clustering with visualization-aided MI validation that improves the accuracy and the stability of identified patterns, generally the structure of HD data with missing values.

10 Claims, 6 Drawing Sheets

(51) Int. Cl.
  *G06F 15/18*  (2006.01)
  *G06G 7/00*  (2006.01)
  *G06N 7/02*  (2006.01)
  *G06K 9/62*  (2006.01)
  *G06T 7/20*  (2017.01)

(52) U.S. Cl.
  CPC .............. *G06K 9/6253* (2013.01); *G06T 7/20* (2013.01); *G06T 2207/30241* (2013.01)

(56) References Cited

U.S. PATENT DOCUMENTS

| | | | |
|---|---|---|---|
| 2003/0161500 A1* | 8/2003 | Blake | G06T 7/277 |
| | | | 382/103 |
| 2004/0133531 A1 | 7/2004 | Chen et al. | |
| 2006/0122816 A1 | 6/2006 | Shadt et al. | |
| 2008/0313135 A1* | 12/2008 | Alexe | G06F 16/285 |
| | | | 707/999.002 |
| 2011/0064285 A1* | 3/2011 | Chen | G06T 5/20 |
| | | | 382/128 |
| 2014/0207493 A1* | 7/2014 | Sarrafzadeh | G16H 50/20 |
| | | | 705/3 |

OTHER PUBLICATIONS

Fang et al. "A New Look at Quantifying Tobacco Exposure during Pregnancy Using Fuzzy Clustering"; Neurotoxicol Teratol. vol. 33 No. 1; Publication [Online]. 2011. [retrieved May 2015]. Retrieved from internet:<URL:http://www.ncbi.nlm.nih.gov/pmc/articles/PMC3052936/>; pp. 1-24.

PCT International Search Report and Written Opinion dated Jun. 25, 2015 for International Application No. PCT/US2015/014792, entitled "System and Methods for Trajectory Pattern Recognition," 11 pages.

H. Fang and Z. Zhang, "An Enhanced Visualization Method to Aid Behavioral Trajectory Pattern Recognition Infrastructure for Big Longitudinal Data," in IEEE Transactions on Big Data, vol. 4, No. 2, pp. 289-298, Jun. 1, 2018, doi: 10.1109/TBDATA.2017.2653815.

H. Fang, H. Wang, C. Wang and M. Daneshmand, "Using probabilistic approach to joint clustering and statistical inference: Analytics for big investment data," 2015 IEEE International Conference on Big Data (Big Data), Santa Clara, CA, 2015, pp. 2916-2918, doi: 10.1109/BigData.2015.7364121.

\* cited by examiner (a) Andrews Curve (b) Grand tour (c) EPP (a) Andrews Curve (b) Grand tour (c) EPP

SYSTEM AND METHODS FOR TRAJECTORY PATTERN RECOGNITION

CROSS REFERENCE TO RELATED PATENTS

This application claims the benefit of U.S. Provisional Patent Application No. 61/936,671 filed Feb. 6, 2014, which is incorporated by reference.

STATEMENT OF FEDERALLY SPONSORED RESEARCH

This invention was made with government support under grant nos. DA033323 and RR031982 awarded by the National Institute of Health. The government has certain rights in the invention.

FIELD OF THE INVENTION

The invention relates generally to data analysis. More specifically, the invention relates to a system and methods for trajectory pattern recognition that improves the accuracy and stability of identified patterns, including the structure of high-dimensional (HD) data with missing values. The improved accuracy and stability of patterns can be used for a variety of purposes including for example, analyzing the variation in outcomes such as those resulting from clinical trials or observational studies.

BACKGROUND OF THE INVENTION

Longitudinal studies including cohort studies and panel studies involve data directed to repeated observations of the same variables over long periods of time. Longitudinal studies make observing changes more accurate and are applicable in a variety of applications.

High-dimensional (HD) data is common in longitudinal studies. HD data includes data ranging up to many thousands of dimensions. For example, high-dimensional data often arises in areas such as medicine, but any technology is contemplated including those that involve a large number of data points (i.e., measurements). However, visualizing HD data is problematic with an infinite amount of dimensions available. HD data can be visualized by projecting the HD data to a lower-dimensional space. One technique known as projection pursuit is a type of statistical technique which involves finding the most interesting possible projections in HD data. According to projection pursuit, the projection or projections are located from high-dimensional space to low-dimensional (i.e., 2D) space that reveal the most details about the structure of the data set. Often, projections which deviate more from a normal distribution are considered to be most interesting. As each projection is found, the data are reduced by removing the component along that projection, and the process is repeated to find new projections. Once located in low-dimensional space, the set of projection structures—clusters, surfaces, etc. —can be extracted and analyzed separately.

Visualizing HD data can provide knowledge regarding data patterns, which can represent a variety of information. Data patterns, for example, may represent human behavior such as patterns of cocaine use or heterogeneity of treatment effect (HTE), which is the nonrandom, explainable variability in medical treatment effects for individuals. HTE is common in translational research, especially in complex, multi-component interventions, such as Phase III trials designed to move evidence-based guidelines into practice. Even in a randomized controlled trial (RCT), outcomes differ among patients within treated and control groups. Methods that can extract the full information implicit in HTE hold great promise for delivering patient-centered care. As an example, one main goal of HTE analysis is to estimate treatment effects in clinically relevant subgroups and to predict whether an individual might benefit from a particular treatment.

Thus, there is a demand for a system and methods for trajectory pattern recognition that improves the accuracy and stability of identified patterns, including the structure of high-dimensional (HD) data that may be used in analyzing the variation in longitudinal data.

SUMMARY OF THE INVENTION

The invention is directed to a system and methods for trajectory pattern recognition including algorithms that include new multiple-imputation (MI)-based fuzzy clustering, static pattern visualization, dynamic trajectory pattern visualization, and validation. More specifically, the invention is robust to hyper-spherical and hyper-ellipsoidal clusters including the detection of distinctive shapes where classic methods failed. The invention dynamically displays and clusters correlated high-dimensional, longitudinal data with missing values, potentially useful for real-time data.

Since longitudinal data is typically directed to repeat observations of the same variables over long periods of time, it is likely that certain longitudinal data is changing or missing resulting in variations in the data. Variations in the data of over time may contribute to different outcomes. Failure to appreciate these variations within clusters of data, not only those between clusters of data, can ultimately lead to inappropriate and ineffective results.

In one embodiment, the invention is directed to a clustering model that employs a full theoretical integration of (a) multiple imputation and fuzzy clustering; (b) comprehensive visualization-aided validation. Importantly, it considers real-world situations where participants have membership in multiple clusters. Additionally, the invention handles error-prone, non-normal, high-dimensional longitudinal data with missing values. Furthermore, the invention provides visualization and validation of patterns.

Multiple imputation reduces the introduction of bias and loss of precision as compared to standard methods for imputing missing data (e.g., mean, regression, and hot deck). According to the invention multiple imputation techniques are integrated into the clustering to account for imputation uncertainty, making it robust to data that are completely missing at random or missing at random. Multiple imputation is robust to non-ignorable missing at random when data are high-dimensional (especially repeated measures) and missing information is less than 25%.

Fuzzy clustering occurs when clusters "touch" or "overlap" such as a single individual in a longitudinal study can have multiple memberships. The invention considers a participant that belongs to different clusters with a different degree of membership in each cluster. For example, the participant may have a higher degree of membership in the cluster with overall "persistent" response behavior during a treatment (as in "most often persistent") and a lower degree in a "non-persistent" cluster (as in "but sometimes not persistent"). Unlike typical clustering models, the invention uses "fuzzy degrees" to handle this multiple membership situation by assigning each participant a fuzzy degree or score of membership in each cluster. This score "summarizes" the participants' response over time.

Unlike classic projection pursuit algorithms such as Andrews Curve and Grand Tour, the enhanced projection pursuit algorithm does not assume trigonometric properties because not all longitudinal data fit such transformation. More specifically, the invention builds upon nonlinear mapping algorithms, minimizes its stress (error) function by optimizing the paired weights between and within cluster stress while preserving original structure membership in the high-dimensional space. According to one embodiment of the invention, a non-deterministic polynomial-time (NP) hard optimization problem integrates gradual optimization and non-linear mapping algorithms, and automates the searching of optimal number of iterations to display a stable structure for varying sample sizes and dimensions (or attributes).

Integrating multiple imputation with fuzzy clustering provides for a pattern recognition. Pattern recognition according to the invention also involves pattern validation and visualization using enhanced projection pursuit since validation indices are not enough, thus helping pattern identification/recognition.

The use of comprehensive visualization-aided validation is replicable and tractable or transparent in order to validate patterns.

The invention is applicable to a wide variety of applications involving longitudinal observational studies and clinical trials including typical randomized clinical trials and pragmatic trials. As an example, the invention may be used with dietary and physical activities including those focusing on dietary pattern recognition as well as observational studies for any chronic diseases including obesity, diabetes and cardiovascular disease, etc. A successful dietary change is paramount for preventing these chronic diseases. Identifying who are likely to respond to which dietary components can facilitate adaptive dietary treatments and personalized medicine.

Longitudinal data on dietary intake patterns is helpful in understanding how diet may impact on health and functional status over the human lifespan. Characterizing longitudinal dietary patterns holds the key to developing more effective interventions. The invention is a visualization-aided trajectory pattern-validation approach that may be used to characterize complex dietary response behaviors and untangle the effect of dietary patterns on various outcomes such as body weight, incidence of diabetes and atherosclerotic cardiovascular disease (ASCVD) events including myocardial infarction, stroke, and cardiovascular disease death.

The invention may be used to recognize "latent" response trajectory patterns. According to the invention, the pattern-recognition approach—robust to statistical distributions, non-normal, high-dimensionality and missing data—can be used to untangle informative response variations. The invention may be used to generate latent patterns by simultaneously considering all available and relevant resources.

As another example, the invention may be used in health risks studies such as those involving Medicare and Medicaid data. The invention may also be used with generally longitudinal consumer behavior data such as that pertaining to investment and credit risk. For example, the invention may be used to evaluate the effectiveness of contrarians' investment in preferred stocks using big data. Other applications include business intelligence and data mining as well as security and fraud detection including image authentication.

In addition, the invention is applicable to parameter trajectory pattern recognition especially for real time millisecond data. Compared to existing clustering methods, the invention is applicable to infectious and immunology data, for example, detecting different and correct patterns for measles virus data.

It is also contemplated the system and methods for trajectory pattern recognition according to the invention may be applicable to real time biosensor data or from a body sensor network. With biosensors being increasingly promoted for use in behavioral interventions, the vast amount of data generated from their applications in real-time event monitoring is informative based on its processing and analysis. According to the invention, real-time substance-use detection of biosensors is assessed using parameter trajectory pattern description. For example, parameter trajectory description reserves and captures abrupt Simple Notification Service (SNS) changes even among millisecond data. The parameter trajectory description according to the invention can assist in real-time biosensor data analytics for detecting drug abuse episodes in behavioral science and drug abuse.

In one particular embodiment, pattern recognition techniques are used for analyzing heterogeneity effects including a heterogeneity of treatment effect. In particular, the techniques described herein may be used to analyze heterogeneity effects of behavioral interventions used to facilitate smoking cessation as well as observational studies. In one example, this invention describes a device that may analyze patient variation in a multi-component treatment intervention. In one example, a device such as a computing device may be configured to analyze heterogeneity effects.

According to one example of the invention, a method for analyzing a heterogeneity effect comprises receiving one or more datasets associated with a population, or sample thereof, of subjects, wherein the dataset includes a plurality of components and one or more attributes associated with each of the plurality of components, imputing missing attribute values into the one or more datasets based on a multiple imputation technique, identifying one or more trajectory patterns or clusters from the imputed datasets, performing a multiple imputation based cluster validation on the one or more identified clusters or trajectory patterns, and comparing data associated with one or more individual subjects to the one or more identified clusters or trajectory patterns.

According to another example of the invention a device for analyzing a heterogeneity effect, comprises one or more processors configured to receive one or more datasets associated with a population, or sample thereof, of subjects, wherein the dataset includes a plurality of components and one or more attributes associated with each of the plurality of components, impute missing attribute values into the one or more datasets based on a multiple imputation technique, identify one or more trajectory patterns or clusters from the imputed datasets, performing a multiple imputation based cluster validation on the one or more identified clusters or trajectory patterns, and compare data associated with one or more individual subjects to the one or more identified clusters or trajectory patterns.

According to another example of the invention a non-transitory computer-readable storage medium has instructions stored thereon that upon execution cause one or more processors of a device to receive one or more datasets associated with a population, or sample thereof, of subjects, wherein the dataset includes a plurality of components and one or more attributes associated with each of the plurality of components, impute missing attribute values into the one or more datasets based on a multiple imputation technique, identify one or more trajectory patterns or clusters from the imputed datasets, perform a multiple imputation based cluster validation on the one or more identified clusters or trajectory patterns, and comparing data associated with one or more individual subjects to the one or more identified clusters or trajectory patterns.

According to another example of the invention an apparatus for analyzing a heterogeneity effect comprises means for receiving one or more datasets associated with a population, or sample thereof, of subjects, wherein the dataset includes a plurality of components and one or more attributes associated with each of the plurality of components, means for imputing missing attribute values into the one or more datasets based on a multiple imputation technique, means for identifying one or more trajectory patterns or clusters from the imputed datasets, means for performing a multiple imputation based cluster validation on the one or more identified clusters or trajectory patterns, and means for comparing data associated with one or more individual subjects to the one or more identified clusters or trajectory patterns.

The details of one or more examples are set forth in the accompanying drawings and the description below. Other features, objects, and advantages will be apparent from the description and drawings, and from the claims.

DETAILED DESCRIPTION OF EMBODIMENTS OF THE INVENTION

The enhanced projection pursuit method according to the invention improves the accuracy and stability of identified patterns, generally the structure of HD data. The invention automates the searching and finds the optimal number of iterations to display a stable structure base on factors such as sample size and the number of variables.

Figure 1:
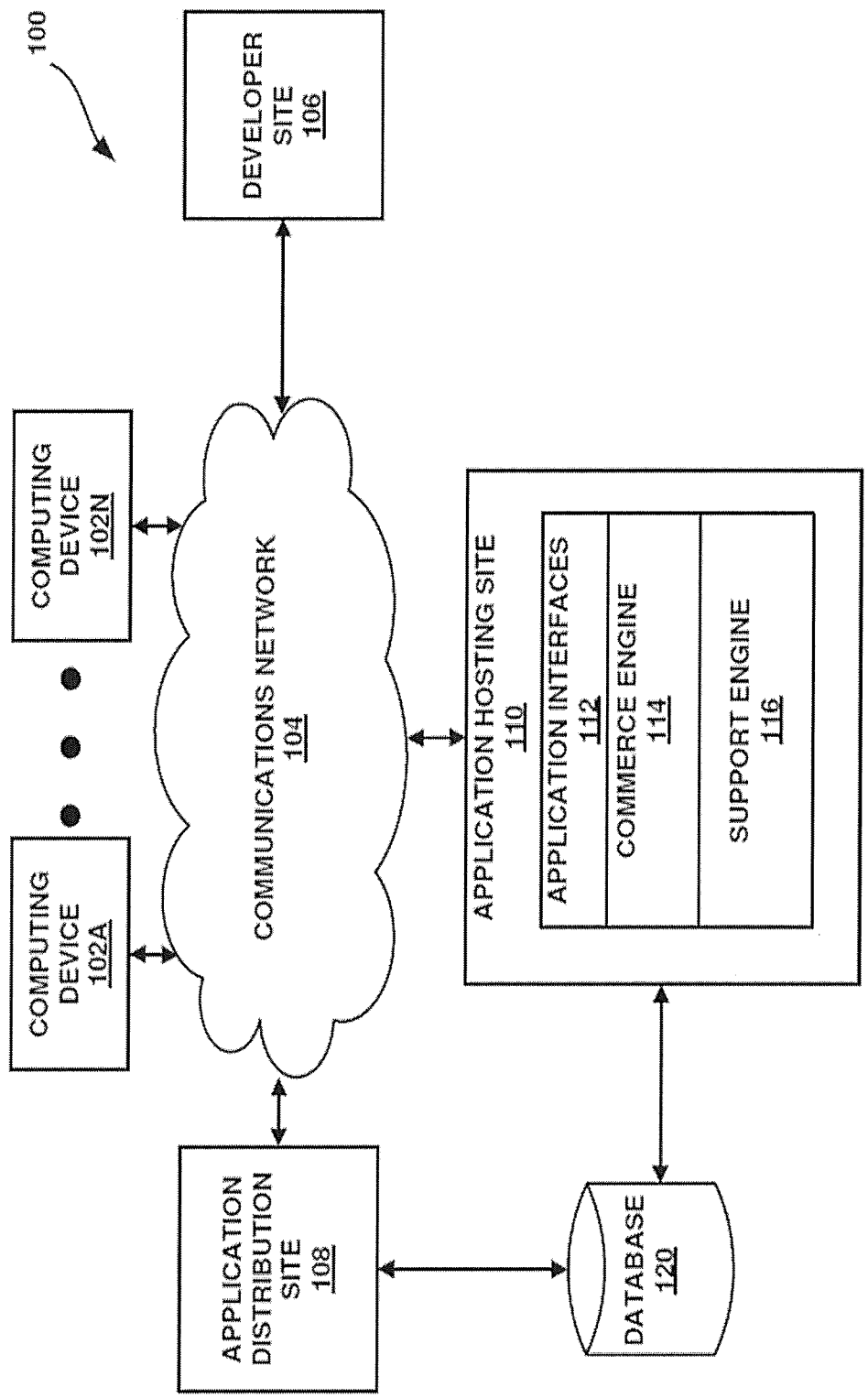
FIG. 1 is a block diagram illustrating an example system that may implement one or more techniques of this invention.

FIG. 1 is a block diagram illustrating an example system that may implement one or more techniques of this invention. System 100 may be configured to analyze a heterogeneity effect in accordance with the techniques described herein. In the example illustrated in FIG. 1, system 100 includes one or more computing devices 102A-102N, communications network 104, developer site 106, application distribution site 108, and application hosting site 110. Application hosting site 110 may include application interface 112, commerce engine 114, and support engine 116. Further, as illustrated in FIG. 1, application distribution site 108 and application hosting site 110 may be connected to database 120. System 100 may include software modules operating on one or more servers. Software modules may be stored in a memory and executed by a processor. Servers may include one or more processors and a plurality of internal and/or external memory devices. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow software applications to be developed, distributed, and executed on a plurality of computing devices, such as computing devices 102A-102N. In the example illustrated in FIG. 1, computing devices 102A-102N may respectively include any device configured to transmit data to and receive data from communication network 104. For example, computing devices 102A-102N may be equipped for wired and/or wireless communications and may include desktop or laptop computers, mobile devices, smartphones, cellular telephones, set top boxes, and personal gaming devices.

Communications network 104 may comprise any combination of wireless and/or wired communication media. Communication network 104 may include routers, switches, base stations, or any other equipment that may be useful to facilitate communication between various devices and sites. Communication network 104 may form part of a packet-based network, such as a local area network, a wide-area network, or a global network such as the Internet. Communication network 104 may operate according to one or more communication protocols, such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 1, developer site 106 is connected to communications network 104. Developer site 106 may be configured to enable one or more software developers to author, maintain, update, improve, and/or monitor software applications. Developer site 106 may be part of an organization that provides software applications. In the example where computing devices 102A-102N are mobile devices, such as, for example, smartphones, developer site 106 may be configured to provide software applications for use with a mobile device. Software applications for use with a mobile device may be referred to as apps. Developer site 106 may include one or more developer workstations (not shown) in communication with one another. Developer workstations may include any device such as, a laptop or a desktop computer capable of coding software functions. Developer workstations may include computers running an operation system, such as, for example, Linux, and/or operation systems developed by Microsoft and Apple. Developer site 106 may include any combination of hardware and software that enables developers to code software according to a specified programming language. Examples of programming languages include Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ and other compilers, assemblers, and interpreters. In some examples, developers may write software applications using a software development kit (SDK) provided by a device manufacturer or a data service provider.

As illustrated in FIG. 1, application distribution site 108 is connected to communications network 104. Application distribution site 108 may be configured to receive a developed software application and distribute a developed application to computing devices 102A-102N. Further, in some examples, application distribution site 108 may be configured to distribute supporting software to hosting site 110. In the example where one or more of computing devices 102A-102N are mobile devices, application distribution site 108 may be maintained by a mobile device manufacturer, a service provider, and/or a mobile device operating system provider. An application distribution site that is maintained by a mobile device manufacturer, a service provider, or a mobile device operating system provider may be referred to as an app store. Examples of app stores include Google Play, the Apple App Store, BlackBerry World, Windows Phone Store, and the Amazon Appstore.

As illustrated in FIG. 1, application hosting site 110 is connected to communications network 104. Application hosting site 110 is configured to support the operation of a software application on one or more of computing devices 102A-102N. For example, if a software application provides interaction between two or more of computing devices 102A-102N, application hosting site 110 may be configured to support interaction between computing devices 102A-102N. In the example illustrated in FIG. 1, application hosting site 110 includes application interface 112, commerce engine 114, and support engine 116. Application interface 112, commerce engine 114, and support engine 116 may be implemented as any of a variety of suitable circuitry, such as one or more microprocessors, digital signal processors (DSPs), application specific integrated circuits (ASICs), field programmable gate arrays (FPGAs), discrete logic, software, software modules, hardware, firmware or any combinations thereof.

Application interface 112 may be configured to provide an interface between application hosting site 110 and one or more of computing devices 102A-102N for a hosted aspect of an application. Commerce engine 114 may be configured to support transactions that may occur when a user uses a software application. Commerce engine 114 may include a number of components required for online commerce. For example, commerce engine 114 may include modules with instructions stored on a computer readable medium that when executed by a processor cause application hosting site 110 to perform functions related to customer accounts, orders, subscriptions, tax, payments, fraud, and credit processing.

Support engine 116 may be configured to provide support services associated with an application. In one example, support engine 116 may be configured to provide updates to an application installed on one of user devices 102A-102N. As illustrated in FIG. 1, database 120 is connected to application hosting site 110 and application distribution site 108. Database 120 may include any of the memory device described above. Database 120 may store information associated with the operation of an application. For example database 120 may store user account information, multimedia associated with an application, and/or user credentials.

Figure 2:
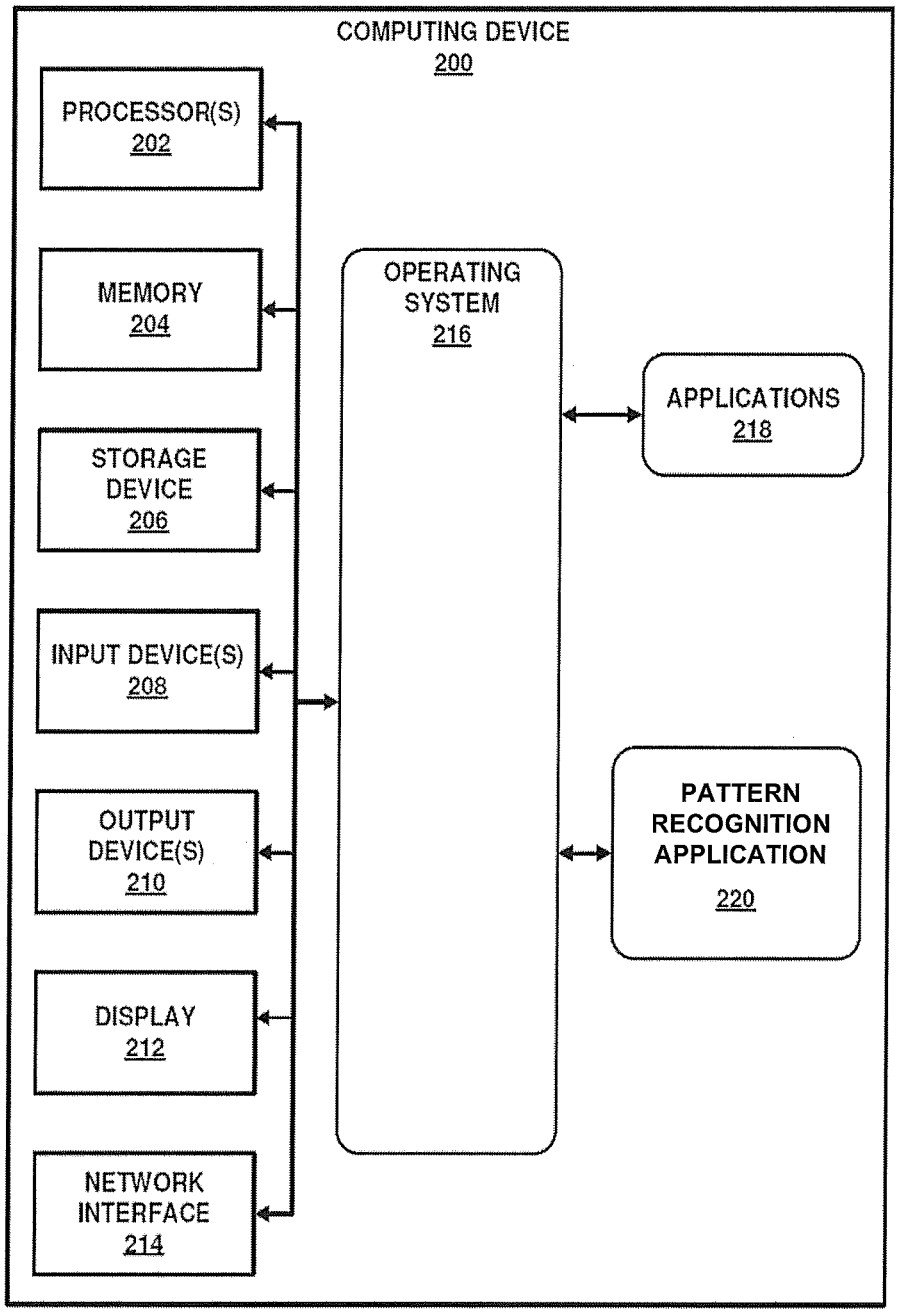
FIG. 2 is a block diagram illustrating an example of a computing device that may implement one or more techniques of this invention.

FIG. 2 is a block diagram illustrating an example of a computing device that may implement one or more techniques of this invention. Computing device 200 is an example of a computing device that may be configured to transmit data to and receive data from communication network 104 and execute one or more applications (e.g., pattern recognition application 220). Computing device 200 may include or be part of a portable computing device (e.g., a mobile phone, netbook, laptop, personal data assistant (PDA), or tablet device) or a stationary computer (e.g., a desktop computer, or set-top box), or may be another computing device. Computing device 200 includes processor(s) 202, memory 204, storage device 206, input device(s) 208, output device(s) 210, display 212, and network interface 214. Each of processor(s) 202, memory 204, storage device 206, input device(s) 208, output device(s) 210, display 212, and network interface 214 may be interconnected (physically, communicatively, and/or operatively) for inter-component communications. Operating system 216, applications 218, and pattern recognition application 220 may be executable by computing device 200. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

Processor(s) 202 may be configured to implement functionality and/or process instructions for execution in computing device 200. Processor(s) 202 may be capable of retrieving and processing instructions, code, and/or data structures for implementing one or more of the techniques described herein. Instructions may be stored on a computer readable medium, such as memory 204 or storage device 206. Processor(s) 202 may be digital signal processors (DSPs), general purpose microprocessors, application specific integrated circuits (ASICs), field programmable logic arrays (FPGAs), or other equivalent integrated or discrete logic circuitry.

Memory 204 may be configured to store information that may be used by computing device 200 during operation. As described above, memory 204 may be used to store program instructions for execution by processor(s) 202 and may be used by software or applications running on computing device 200 to temporarily store information during program execution. For example, memory 204 may store instructions associated with operating system 216, applications 218, and pattern recognition application 220 or components thereof, and/or memory 204 may store information associated with the execution of operating system 216, applications 218, and pattern recognition application 220. Memory 204 may be described as a non-transitory or tangible computer-readable storage medium. In some examples, memory 204 may provide temporary memory and/or long-term storage. In some examples, memory 204 or portion thereof may be described as volatile memory, i.e., in some cases memory 204 may not maintain stored contents when computing device 200 is powered down. Examples of volatile memories include random access memories (RAM), dynamic random access memories (DRAM), and static random access memories (SRAM).

Storage device 206 represents memory of computing device that may be configured to store relatively larger amounts of information for relatively longer periods of time than memory 204. Similar to memory 204, storage device 206 may also include one or more non-transitory or tangible computer-readable storage media. Storage device 206 may be internal or external memory and in some examples may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Input device(s) 208 may be configured to receive input from a user operating computing device 200. Input from a user may be generated as part of a user running one or more software applications, such as applications 218 and/or pattern recognition application 220. Input device(s) 208 may include a touch-sensitive screen, track pad, track point, mouse, a keyboard, a microphone, video camera, or any other type of device configured to receive input from a user. In one example, input device(s) 208 may generate one or more signals corresponding to the coordinates of a position touched on a touchscreen of computing device 200. These signals may be provided as information to components of computing device 200 (e.g., processor 202, or operating system 216) in conjunction with the execution of applications 218 and/or pattern recognition application 220

Output device(s) 210 may be configured to provide output to a user operating computing device 200. Output may tactile, audio, or visual output generated as part of a user running one or more software applications, such as applications 218 and/or pattern recognition application 220. Output device(s) 210 may include a touch-sensitive screen, sound card, a video graphics adapter card, or any other type of device for converting a signal into an appropriate form understandable to humans or machines. Additional examples of an output device(s) 210 may include a speaker, a cathode ray tube (CRT) monitor, a liquid crystal display (LCD), or any other type of device that can provide output to a user. In some examples, output device(s) 210 may be external to computing device 200 and may be operatively coupled to computing device 200 using a standardized communication protocol, such as for example, Universal Serial Bus protocol (USB) or High-Definition Multimedia Interface (HDMI).

In the example illustrated in FIG. 2, computing device 200 includes display 212. In the example where computing device 200 is a mobile device, display 212 may be an integrated touch-screen display. For example, display 212 may be an LCD or organic light emitting diode (OLED) display configured to receive user touch inputs, such as, for example, taps, drags, and pinches. Thus, display 212 may be considered as a particular type of input and output device of computing device 200. Display 212 may be configured to allow a user to interact with the pattern recognition application 220, as describe in detail below.

Network interface 214 may be configured to enable computing device 200 to communicate with external devices via one or more networks, such as communications network 104. Network interface 214 may be a network interface card, such as an Ethernet card, an optical transceiver, a radio frequency transceiver, or any other type of device that can send and receive information. Network interface 214 may be configured to operate according to one or more of the communication protocols described above with respect to communications network 104.

Operating system 216 may be configured facilitate the interaction of applications, such as application 218 and pattern recognition application 220, with processor(s) 202, memory 204, storage device 206, input device(s) 208, output device(s) 210, display 212, network interface 214 and other hardware components of computing device 200. Operating system 216 may be an operating system designed to be installed on laptops and desktops. For example, operating system 216 may be a Windows operating system, Linux, or Mac OS. In another example, if computing device 200 is a mobile device, such as a smartphone or a tablet, operating system 216 may be one of Android, iOS or a Windows mobile operating system.

Applications 218 may be any applications implemented within or executed by computing device 200 and may be implemented or contained within, operable by, executed by, and/or be operatively/communicatively coupled to components of computing device 200, e.g., processor(s) 202, memory 204, and network interface 214. In one example, an application may be developed by developer site 106 as described above with respect to FIG. 1. Applications 218 may include instructions that may cause processor(s) 202 of computing device 200 to perform particular functions. Applications 218 may include algorithms which are expressed in computer programming statements, such as, for loops, while-loops, if-statements, do-loops, etc.

Pattern recognition application 220 may be an application configured to analyzing a heterogeneity effect. In one example, the pattern recognition application 220 may be configured to input/output files compatible with Excel, SAS, Stata, R, and SPSS file formats). In one example, the pattern recognition application 220 may be scalable for use with online large-scale electronic databases.

Studies such as observation studies and randomized control trial (RCT) studies are used to examine the effect of one or more treatments across a population of subjects over a period of time. Typically, a study will include one or more components and one or more attributes associated with a component. For example, a smoking cessation intervention study may include one or more intervention components (e.g., messages to/from a tobacco treatment specialist, encouraging email messages from experts, and an online community). Attributes may include a measurement associated with a component at a defined time period (e.g., number of messages received during a month). Thus, a dataset associated with a sample/population of subjects may include a plurality of components and one or more attributes associated with each of the plurality of components.

Clustering techniques such as, for example, Probabilistic clustering, Neural Networks, Agglomerative Hierarchical clustering, and Partition-based clustering may be used to categorize subjects of a study into groups ("clusters") based on data values of the attributes. Probabilistic clustering, Neural Networks, Agglomerative Hierarchical clustering, and Partition-based clustering may use simple "exposed" and "non-exposed" groups or subgroups based on arbitrarily determined cut-scores (e.g., quintiles or percentages). Simple grouping may overlook important exposure information, or may generate spurious false-positive findings. Further, Probabilistic clustering, Neural Networks, Agglomerative hierarchical clustering, and Partition-based clustering may have deficiencies in analyzing longitudinal multiple-component behavioral RCTs interventions or observational studies. For example, Gaussian, Bayesian, Hierachical and Self Organizing Map (SOM) clustering may not be able to simultaneously, automatically, and effectively handle trajectory pattern recognition.

Further, these clustering techniques may not have embedded and/or transparent validation and diagnosis procedures for situations where subjects can have multiple membership and data are longitudinal, missing, non-normal, high-dimensional and/or correlated. Further, these clustering techniques often need manual testing of a number of patterns, one-by-one. In addition, these clustering techniques may be implemented in a format of source codes or hyper-text code and may need people with advanced computational skills to fulfill the pattern recognition process. There are several disadvantages with respect to clustering techniques.

Fang H, Johnson C, Stopp C, Espy K A. "A new look at quantifying tobacco exposure during pregnancy using fuzzy clustering." Neurotoxicol Teratol, 2011 January-February; 33(1): 155-65, which is incorporated by reference in its entirety describes using a multiple-imputation-based fuzzy clustering (MI-Fuzzy) model to quantify tobacco exposure during pregnancy. MI-Fuzzy techniques may generate latent patterns by simultaneously considering all available and relevant resources and retaining all enrolled subjects and their data (i.e., collected for the purpose of the intervention/treatment/exposure and outcome analyses). The techniques described herein may be based on MI-Fuzzy techniques, such as, for example, those described in Fang et al. and may use actual evidence of subjects' engagement with or responses to interventions/treatments/exposure to capture behavioral changes over time and to identify latent clusters.

Techniques based on multiple-imputation-based fuzzy clustering models may provide a robust pattern recognition tool and may be designed to characterize behavioral patterns in multi-component behavioral intervention/treatment/exposure and examine differential patient responsivity to intervention/treatment/exposure in (longitudinal) RCTs or observational studies. Techniques based on multiple-imputation-based fuzzy clustering models may help evaluate how the intervention/treatment/exposure components work for different patients/subjects, clarify their efficacy/effectiveness, and provide a detailed understanding of how patients/subjects' engagement and response patterns relate to different health outcomes. Techniques based on multiple-imputation-based fuzzy clustering models may be used to help improve these interventions/treatments/exposure for targeted populations, and uncover important relationships. Further, techniques based on multiple-imputation-based fuzzy clustering models may help provide new evidence on high-risk behavioral patterns that may be clinically important for early targeted intervention/treatment.

The techniques described herein provide a pattern-recognition model that employs a full theoretical integration of (a) multiple imputation, (b) fuzzy clustering, and (c) comprehensive validation. The techniques described herein may be based on multiple-imputation-based fuzzy clustering models and be configured to cope with real-world situations where patients/subjects have membership in multiple clusters, handle high-dimensional longitudinal data with missing values, and validate behavioral patterns.

In one example, the techniques described herein may include Multiple Imputation (MI) techniques. Missing attribute data values are very common in clinical trials or observational studies, especially in longitudinal studies. In one example, the techniques described herein integrate MI techniques into clustering to account for imputation uncertainty, making the techniques robust to data that are completely missing at random (CMAR) or missing at random (MAR).

In one example, the techniques described herein may include fuzzy clustering techniques. For example, in a longitudinal smoking cessation study a single individual can have multiple memberships. That is, a subject can belong to different clusters with a different degree of membership in each cluster. The fuzzy clustering techniques described herein may use "fuzzy degrees" to handle multiple membership situations. Further, the fuzzy clustering based techniques described herein may be analytically tractable and computationally efficient and may be especially useful when the data are complex. The fuzzy clustering techniques described herein may handle non-normal and high-dimensional data with missing values and a mix of categorical and continuous variables, without prior assumptions of statistical distributions.

In one example, the techniques described herein may include pattern validation techniques. The embedded pattern validation process described herein may be replicable and tractable ("transparent"). Further, the validation processes described herein may incorporate graphs to visualize patterns generated from high-dimensional data, MI-based clustering indices to validate engagement/response (trajectory) patterns, and statistical tests to examine clusters.

In one example, the techniques described herein may be scalable to accommodate features such as a diagnostic table for checking the certainty of cluster membership, a graphical presentation of trajectory patterns, and computation of individual fuzzy degrees in each trajectory pattern for outcome tests.

The techniques described herein may be particularly useful for recognizing patterns of smokers' behavioral changes over the course of an intervention/treatment/exposure, particularly in Internet and culturally tailored interventions. That is, the techniques used herein may be used to untangle these complex but informative behavioral variations in the intervention/treatment/exposure. The techniques describe herein may be implemented into a user-friendly software tool and may be applicable in many areas including but not limited to medical areas. For example, the techniques used herein may be useful to clinicians, basic scientists, educators, and students in any various types of research fields.

Figure 3:
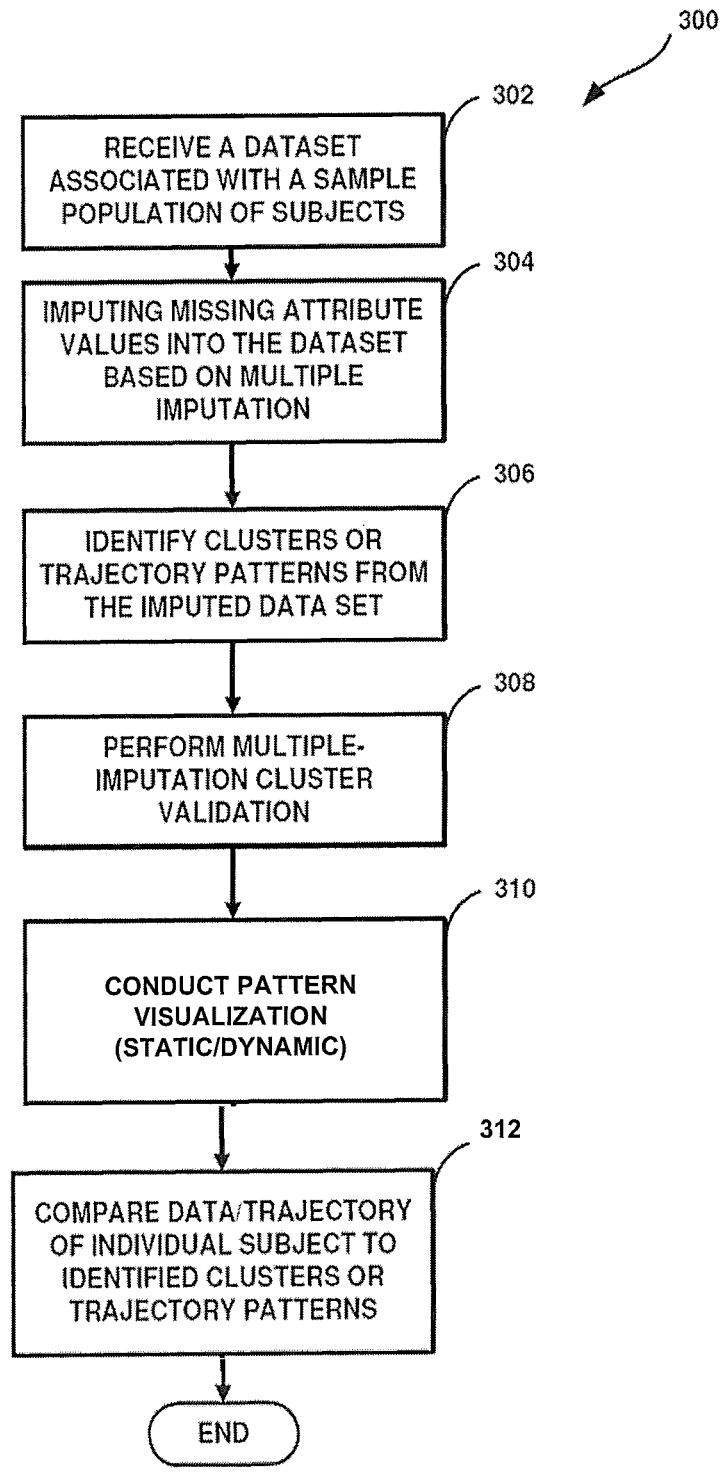
FIG. 3 is a flowchart illustrating an example method for pattern recognition according to one embodiment of the invention.

FIG. 3 is a flowchart illustrating an example method for heterogeneity effect analysis according to the techniques of this invention. Although method 300 is described as being performed by computing device 200, method 300 may be performed by any and all combinations of computing device 200 (e.g., processors 202 executing pattern recognition application 220). As illustrated in FIG. 3, computing device 200 receives a dataset associated with a population, or sample thereof, of subjects (302). In one example, the dataset may describe a population of smoker subjects and include a plurality of components describing behavior interventions used to facilitate smoking cessation. Attribute data values may be missing from a dataset. Computing device 200 may determine whether data is missing in a dataset and impute missing attribute values into the dataset (304). In one example, imputing missing attribute values into the dataset may include performing a multiple imputation technique, such as, for example those described in Fang et al. When multiple imputation is performed multiple imputed datasets may be generated. Computing device 200 identifies clusters and/or trajectory patterns from the imputed dataset (306). In one example, identifying one or more clusters from the imputed dataset includes performing a fuzzy clustering technique, such as, for example, any and all combinations of fuzzy clustering techniques described in Fang et al. Computing device 200 performs cluster validation (308). In one example, performing cluster validation may include using multiple-imputation cluster validation techniques and may include, for example, examining one or more of: clustering rates and validation indices. In one example, performing cluster validation may include performing Sammon mapping. Performing cluster validation may include performing any and all combinations of cluster validation techniques described in Fang et al. Computing device 200 conducts pattern visualization (310), which may be static or dynamic. The steps of pattern visualization (310) are described more fully in reference to FIG. 4.

Computing device 200 compares individual subject data and/or trajectory patterns to validated clusters data and/or trajectory patterns (312). In one example, computing device 200 may illustrate clusters data and/or trajectory patterns on a display device (see 410 of FIG. 4). In one example, computing device 200 may generate a diagnosis table to examiner cluster membership uncertainty across identified clusters. In one example, computing device 200 may generate the fuzzy degrees of each individual across identified patterns. In one example, computing device may compute a sample mean trajectory and an estimated mean trajectory for each identified pattern. Further, in one example, computing device may relate identified clusters and/or trajectory patterns to outcomes. Each of these examples may be used to enhance the capacity of MI-Fuzzy in pattern validation and outcome tests. In this manner, computing device 200 represents an example of a device configured to receive a dataset associated with a population of subjects, wherein the dataset includes a plurality of components and one or more attributes associated with each of the plurality of components, impute missing attribute values into the dataset, identify one or more clusters from the imputed dataset, perform cluster validation on the one or more identified clusters, and compare data associated with one or more individual subjects to the one or more identified clusters.

Figure 4:
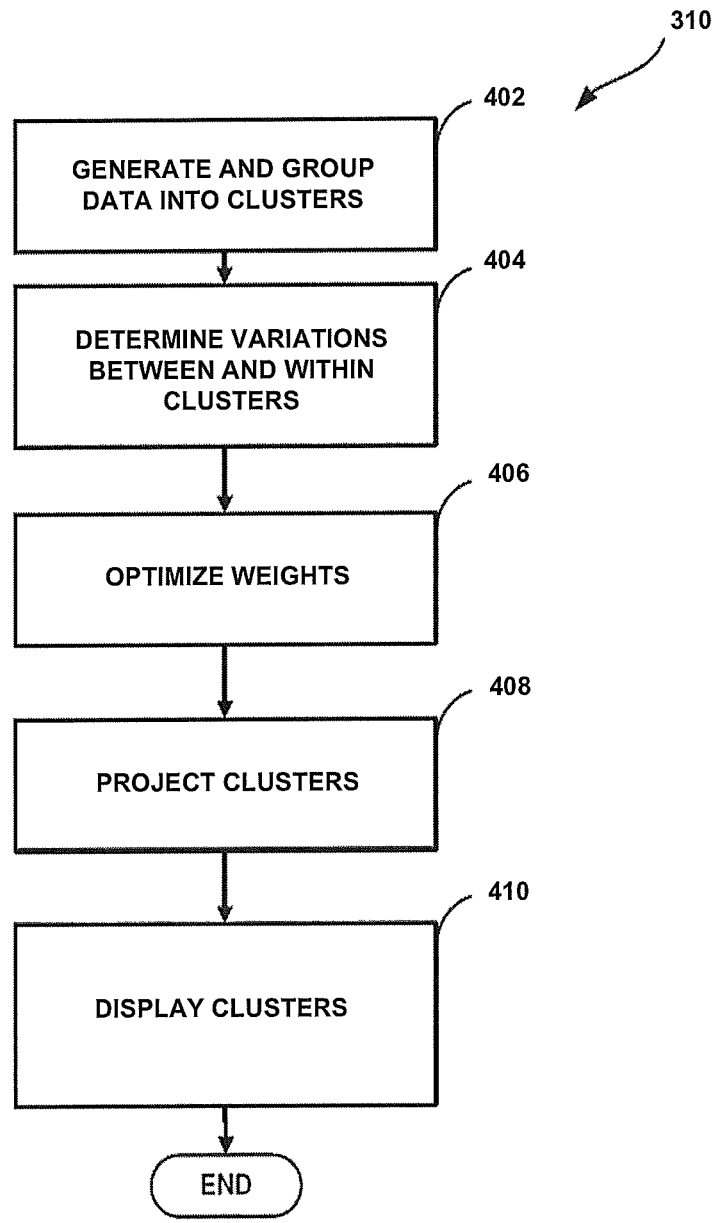
FIG. 4 is a flowchart illustrating an example method for pattern visualization according to one embodiment of the invention.

FIG. 4 is a flowchart illustrating an example method for pattern visualization according to one embodiment of the invention. Pattern visualization, may assist in pattern validation, and therefore pattern recognition as described in FIG. 3. Pattern recognition of longitudinal data is visualized without changing the classification of the longitudinal data in high-dimensional space. Computing device 200 generates data as defined by certain parameters and groups the data according to predefined attributes to obtain a plurality of clusters (402). Each cluster is of a defined cluster size and includes two or more data values. Any missing data value is replaced with a plausible data value. Each data cluster is stored in memory 204 of the computing device 200. Variations between data clusters and within data clusters are determined (404). In one example, identifying one or more clusters from the imputed dataset includes performing a fuzzy clustering technique. Weights are optimized for the variations occurring between two or more data clusters and within each data cluster (406) in order to better segment and visualize structures (e.g., clusters) on a projected two-dimensional plane while preserving their cluster membership in high-dimensional space. Processor 202 of the computing device 200 projects onto a two-dimensional surface the data clusters based on the optimized weights (408). The invention automates the searching and finding of the optimal number of iterations to display a stable structure, for varying sample sizes and dimensions. The data clusters are then displayed (410) on a display device 212 of the computing device 200. Again, cluster validation may be performed using multiple-imputation-based cluster validation techniques and may include, for example, examining one or more of: clustering rates and validation indices.

The enhanced projection pursuit method according to one embodiment of the invention aims to obtain an interesting two-dimensional projection of the original high-dimensional data that minimizes its stress function. As shown in FIG. 4, the invention optimizes the paired weights for between and within cluster stress while preserving original structure membership in the high-dimensional space. This invention integrates gradual optimization and non-linear mapping algorithms.

Figure 5:
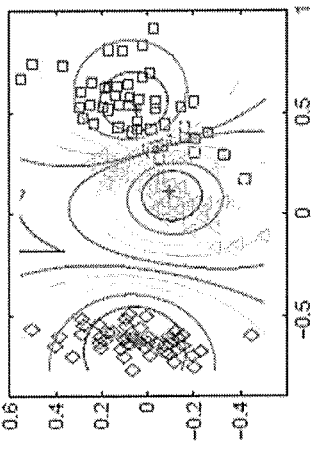
FIG. 5 illustrates the enhanced projection pursuit method for IRIS data according to one embodiment of the invention in comparison to classic projection pursuit methods (Andrews Curve and Grand Tour).
Figure 5:
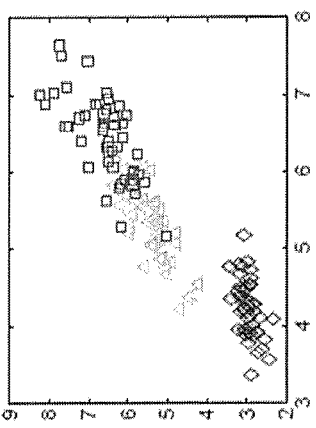
Figure 5:
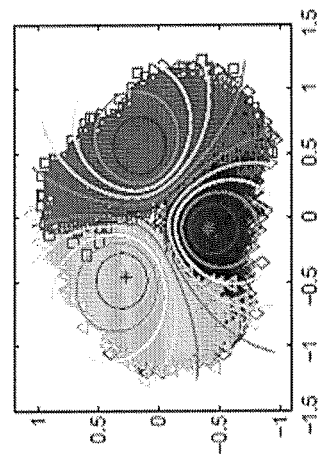
Figure 6:
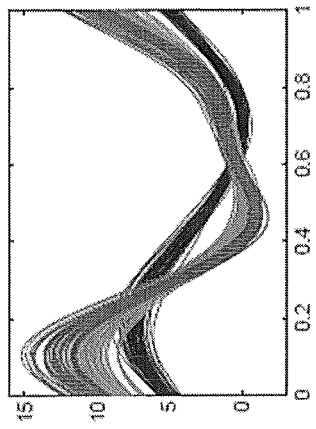
FIG. 6 illustrates the enhanced projection pursuit method for waveform data according to another embodiment of the invention in comparison to classic projection pursuit methods (Andrews Curve and Grand Tour).
Figure 6:
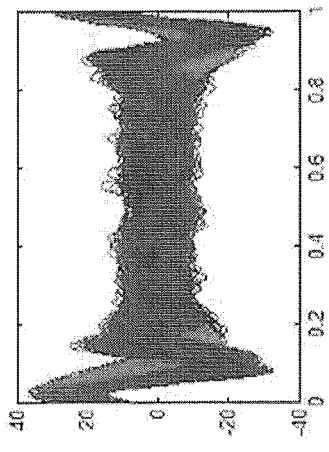
Figure 7:
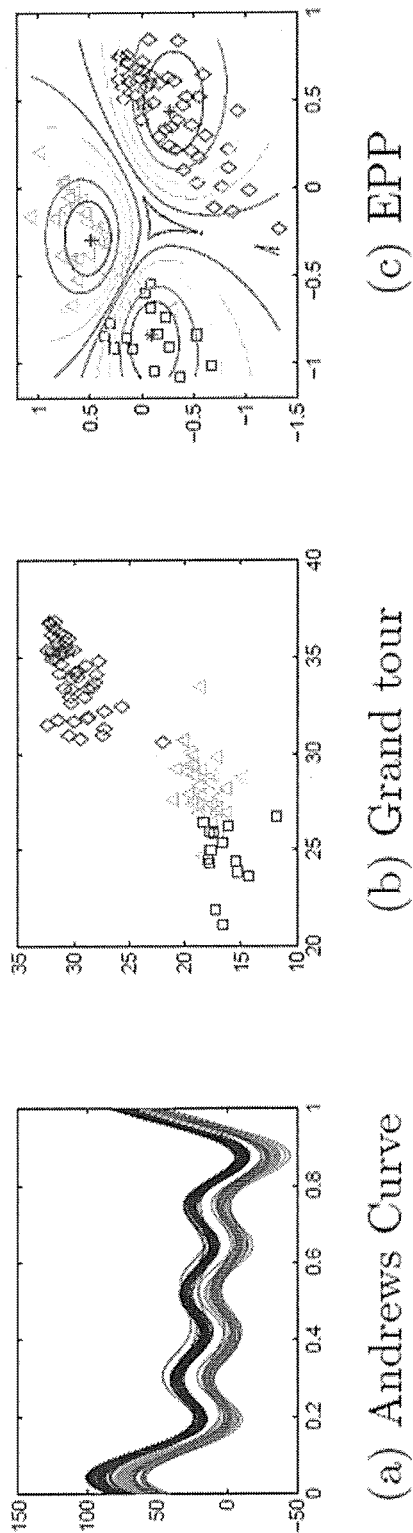
FIG. 7 illustrates the enhanced projection pursuit method for TDTA data according to another embodiment of the invention in comparison to classic projection pursuit methods (Andrews Curve and Grand Tour).
Figure 8:
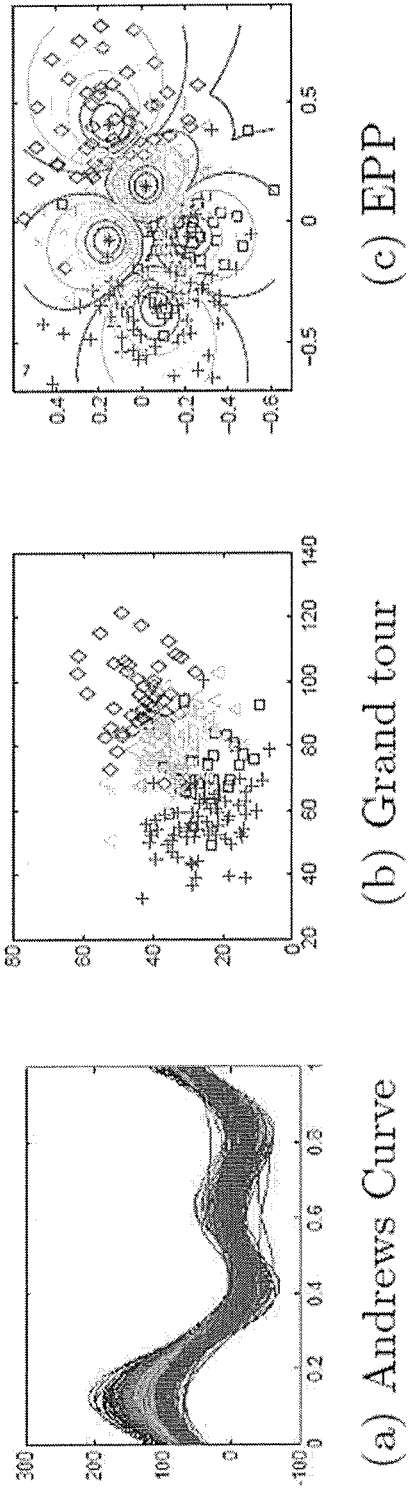
FIG. 8 illustrates the enhanced projection pursuit method for CANDO data according to another embodiment of the invention in comparison to classic projection pursuit methods (Andrews Curve and Grand Tour).

To evaluate the performance of the invention, two publicized and two longitudinal random controlled trials (RCT) datasets were used to compare the invention with Andrews Curves and Grand Tour as shown in FIG. 5, FIG. 6, FIG. 7, FIG. 8. More specifically, FIG. 5 and FIG. 6 illustrate performance in case studies involving IRIS data and waveform data, respectively. FIG. 7 and FIG. 8 illustrate performance in longitudinal data for datasets involving TDTA and CANDO, respectively. The table below summarizes the results:

| Name | IRIS | Waveform | TDTA | CANDO |
| --- | --- | --- | --- | --- |
| Cases(N) | 150 | 5000 | 109 | 240 |
| Dimensions(d) | 4 | 21 | 5 | 8 |
| Time points(t) | 1 | 1 | 4 | 4 |
| Clusters(c) | 3 | 3 | 3 | 5 |

As shown in FIG. 5, the IRIS data consists of 50 samples from each of three species of IRIS: Setosa, Virginica and Versicolor. Four features are measured in centimeters for each length and width of the sepals and petals. As shown in FIG. 5, all three methods are able to identify three patterns for IRIS data.

Turning to FIG. 6, waveform data is generated by a clustering data generator consisting of 5000 cases, each with 21 attributes. There are 3 classes of waves identified for testing algorithms. As shown in FIG. 6, the Andrews Curve and Grand Tour were unable to visualize the three classes while the enhanced projection pursuit of the invention demonstrates its projection power in visualizing the 3-cluster structure.

TDTA data was collected from a longitudinal culturally-tailored smoking cessation intervention for 97 Asian American smokers. It contains three identified culturally-adaptive response patterns with the intervention using three components: (1) cognitive behavioral therapy, (2) cultural tailoring, and (3) nicotine replacement therapy. The first two were measured by scores on Perceived Risks and Benefits, Family and Peer Norms, and Self-efficacy scales. Each scale has four repeated measures for a total of 20 attributes. As shown in FIG. 7, two of the three clusters projected by Andrews Curve were completely overlapped, while Grand Tour and the enhanced projection pursuit of the invention perform well for this longitudinal dataset.

Turning to FIG. 8, CANDO data is collected from a dietary intervention with 240 participants of metabolic syndromes. Five dietary response patterns are identified for this data. All participants respond to 8 dietary quality components: (1) fruit, (2) vegetables, (3) nuts and legumes, (4)

ratio of white to red meat, (5) cereal fiber, (6) trans-fat, (7) ratio of polyunsaturated fat to saturated fat, and (8) alcohol. Each participant has 4 dietary quality scores based on their dietary intake from the 8 dietary components at baseline, 3, 6, 12 months after randomization. FIG. 8 again showcases the strength of the enhanced projection pursuit of the invention over the other two methods for this longitudinal dataset. Projected patterns overlapped using Andrews Curve and one of the five patterns are unable to visualize using Grand Tour.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this invention. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this invention may be implemented in a wide variety of devices or apparatuses, including a wireless handset, an integrated circuit (IC) or a set of ICs (e.g., a chip set). Various components, modules, or units are described in this invention to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While the invention is susceptible to various modifications and alternative forms, specific exemplary embodiments of the present invention have been shown by way of example in the drawings and have been described in detail. It should be understood, however, that there is no intent to limit the invention to the particular embodiments disclosed, but on the contrary, the intention is to cover all modifications, equivalents, and alternatives falling within the scope of the invention as defined by the appended claims.

The invention claimed is:

1. A computer-implemented method for visualizing pattern recognition of longitudinal data, the computer-implemented method comprising:
   receiving one or more datasets associated with a population, or sample thereof, of subjects, wherein the dataset includes a plurality of components and one or more attributes associated with each of the plurality of components;
   producing multiple imputed datasets of longitudinal data by imputing missing attribute values into the one or more datasets based on a multiple imputation technique;
   identifying one or more trajectory patterns or one or more data clusters from the multiple imputed datasets;
   performing a multiple imputation based cluster validation on the one or more trajectory patterns or one or more data clusters, the multiple imputation based cluster validation accounting for imputation uncertainty;
   comparing data associated with one or more individual subjects to the one or more trajectory patterns or one or more data clusters;
   displaying a stable cluster structure for varying sample sizes and dimensions or attributes by automating searching and finding of an optimal number of iterations across the multiple imputed datasets of longitudinal data; and
   illustrating, on a display device, the one or more trajectory patterns or one or more data clusters.

2. The computer-implemented method for visualizing pattern recognition of longitudinal data method of claim 1, wherein comparing data associated with one or more individual subjects to the one or more identified clusters or trajectory patterns includes examining cluster membership uncertainty across the one or more identified clusters or trajectory patterns.

3. The computer-implemented method for visualizing pattern recognition of longitudinal data method of claim 2, wherein examining cluster membership uncertainty across identified clusters or trajectory pattern includes generating a diagnosis table.

4. The computer-implemented method for visualizing pattern recognition of longitudinal data method of claim 1, wherein examining cluster membership uncertainty includes determining average fuzzy degrees of subjects for their most likely latent cluster or trajectory pattern membership.

5. The computer-implemented method for visualizing pattern recognition of longitudinal data method of claim 1, wherein comparing data associated with one or more individual subjects to the one or more identified clusters or trajectory patterns includes generating fuzzy degrees of each subject and using the fuzzy degrees to predict an outcome.

6. The computer-implemented method for visualizing pattern recognition of longitudinal data method of claim 1, wherein comparing data associated with one or more individual subjects to the one or more identified clusters or trajectory-pattern includes comparing mean trajectories to individual subject trajectories.

7. A computer-implemented method for visualizing pattern recognition of longitudinal data without changing the classification of the longitudinal data in high-dimensional space, the computer-implemented method comprising:

receiving, by a processor, two or more data parameters;

generating, with the processor, longitudinal data as defined by the two or more parameters;

grouping the longitudinal data according to predefined attributes to obtain a plurality of data clusters, wherein each data cluster is of a defined cluster size and includes two or more data values and replacing any missing data value with a plausible data value, the grouping and replacing accounting for imputation uncertainty;

storing each data cluster in memory;

determining, with the processor, a plurality of variations of the data clusters, between data clusters, and within the data clusters;

optimizing, with the processor, weights for the plurality of variations of the data clusters, while preserving original structure membership of the longitudinal data in the high-dimensional space, the variations occurring between two or more data clusters and within each data cluster;

projecting, with the processor, onto a two-dimensional surface the data clusters according to the optimizing;

displaying a stable cluster structure for varying sample sizes and dimensions or attributes by automating searching and finding of an optimal number of iterations across the plurality of data clusters of longitudinal data; and displaying, on a display device, the stable cluster structure.

8. The computer-implemented method for visualizing pattern recognition of longitudinal data according to claim 7, wherein said determining includes examining cluster membership uncertainty across the data clusters.

9. The computer-implemented method for visualizing pattern recognition of longitudinal data according to claim 8, wherein said examining includes generating a diagnosis table.

10. The computer-implemented method for visualizing pattern recognition of longitudinal data according to claim 7, wherein the optimizing of the weights is based on gradual optimization and non-linear mapping methods.

* * * * *